United States Patent [19]

Surman

[11] 4,418,568
[45] Dec. 6, 1983

[54] HOT FILM FLUID FLOWMETER WITH AUXILIARY FLOW SENSING

[75] Inventor: James J. Surman, Mt. Clemens, Mich.

[73] Assignee: Eaton Corporation, Cleveland, Ohio

[21] Appl. No.: 300,790

[22] Filed: Sep. 10, 1981

[51] Int. Cl.³ .......................... G01F 5/00; G01F 1/68
[52] U.S. Cl. ....................................... 73/202; 73/204; 73/118
[58] Field of Search ................. 73/204, 118, 202, 203, 73/861.63, 861.64

[56] References Cited

U.S. PATENT DOCUMENTS

| | | | |
|---|---|---|---|
| 790,888 | 4/1905 | Ferris | 73/861.64 X |
| 1,944,316 | 1/1884 | Duerr | 158/99 |
| 3,308,662 | 3/1967 | Maurer | 73/231 |
| 3,407,657 | 10/1968 | Maurer | 73/203 |
| 3,498,127 | 3/1970 | Richards | 73/204 |
| 3,769,835 | 11/1973 | Obermaier et al. | 73/204 |
| 3,834,230 | 9/1974 | Auerbach | 73/199 |
| 4,015,473 | 4/1977 | Kleuters | 73/205 |
| 4,107,991 | 8/1978 | Benson | 73/204 |
| 4,112,757 | 9/1978 | Hayward | 73/207 |
| 4,136,565 | 1/1979 | Migrin | 73/212 |
| 4,163,390 | 8/1979 | Rodder | 73/204 |
| 4,164,144 | 8/1979 | Kaiser | 73/861.64 |
| 4,182,165 | 1/1980 | Kita | 73/194 |
| 4,210,016 | 7/1980 | Peter | 73/116 |
| 4,213,335 | 7/1980 | Peter | 73/204 |
| 4,214,478 | 7/1980 | Lauterbach | 73/204 |
| 4,228,768 | 10/1980 | Kita | 123/494 |
| 4,244,217 | 1/1981 | Ledbetter | 73/204 |
| 4,245,502 | 1/1981 | Eiermann | 73/204 |
| 4,245,503 | 1/1981 | Hawk et al. | 73/204 |
| 4,264,961 | 4/1981 | Nishimura et al. | 73/204 X |

FOREIGN PATENT DOCUMENTS 25149 3/1981 European Pat. Off. .......... 73/118 A
544000 3/1942 United Kingdom .
155631 10/1963 U.S.S.R. .

OTHER PUBLICATIONS

"Isuzu's New Coupe Incorporates Electronic and Electric Features", Automotive Engineering, Aug. 1981, 90-92.

Primary Examiner—S. Clement Swisher
Assistant Examiner—John E. Chapman, Jr.
Attorney, Agent, or Firm—C. H. Grace; J. G. Lewis

[57] ABSTRACT

A low pressure drop hot film/swirl air flowmeter (10) for an automotive engine is disclosed. The flowmeter includes a main air flow passage (18), a relatively small secondary passage such as a venturi (20) disposed within the passage for receiving a portion of the air flow, a tertiary passage (50) which draws an air sample from the main air flow passage and discharges it into the venturi throat (44), a constant temperature thermal anemometer (48) positioned to sense the sample air flowing in the tertiary passage, and a set of swirl vanes (22) operative to impart a swirl to the remainder of the air in the main passage, thereby creating a reduced pressure at the venturi outlet for forced aspiration therethrough without appreciably increasing the pressure drop across the flowmeter. The anemometer includes a bridge circuit (114), one leg of which comprises a resistive sensor (82) within the tertiary passage. In the preferred embodiment of the invention, an ambient air temperature sensor (84) is included as another of the legs of the bridge to provide temperature compensation for the flowmeter. The anemometer generates an output signal representative of total mass air flow through the flowmeter.

26 Claims, 12 Drawing Figures

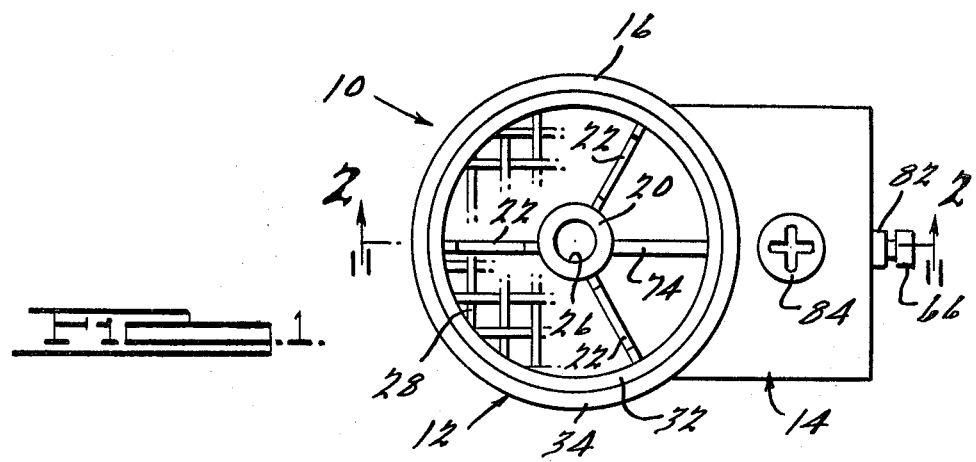
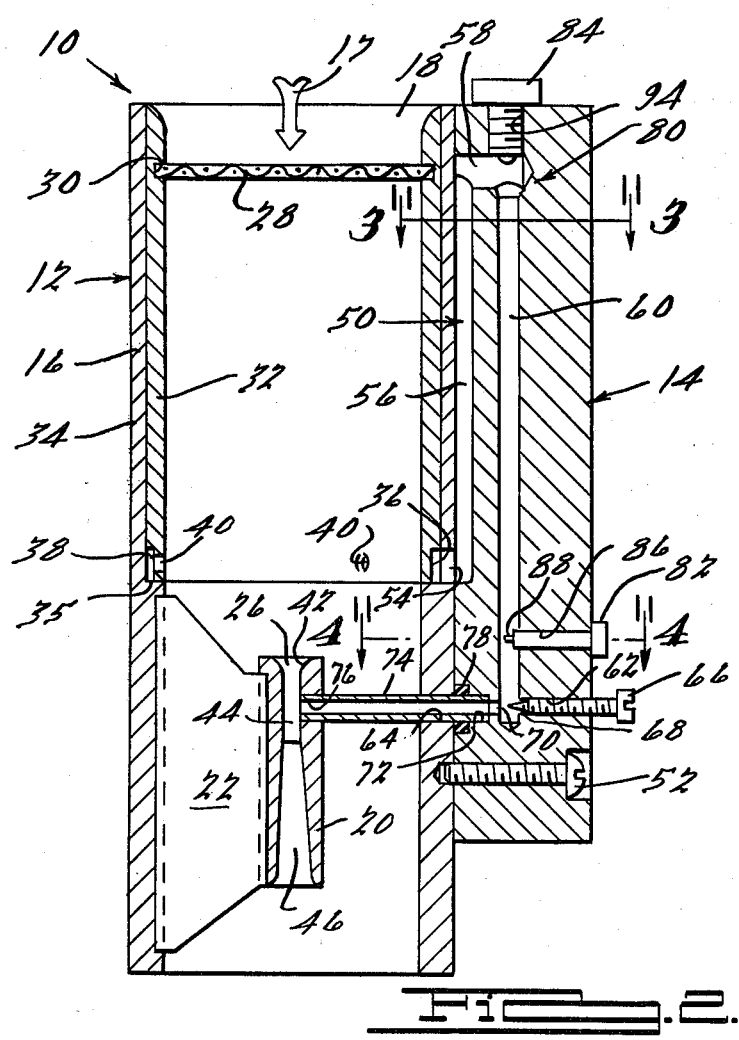

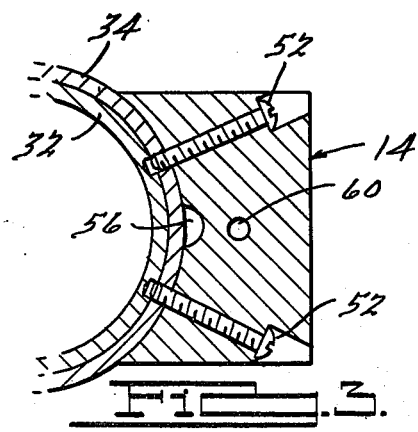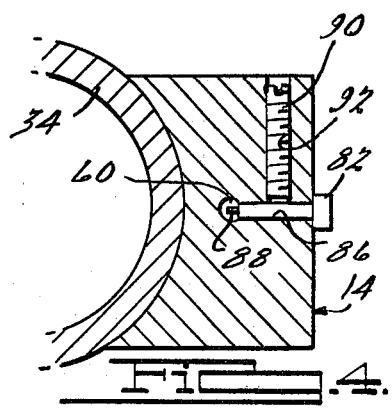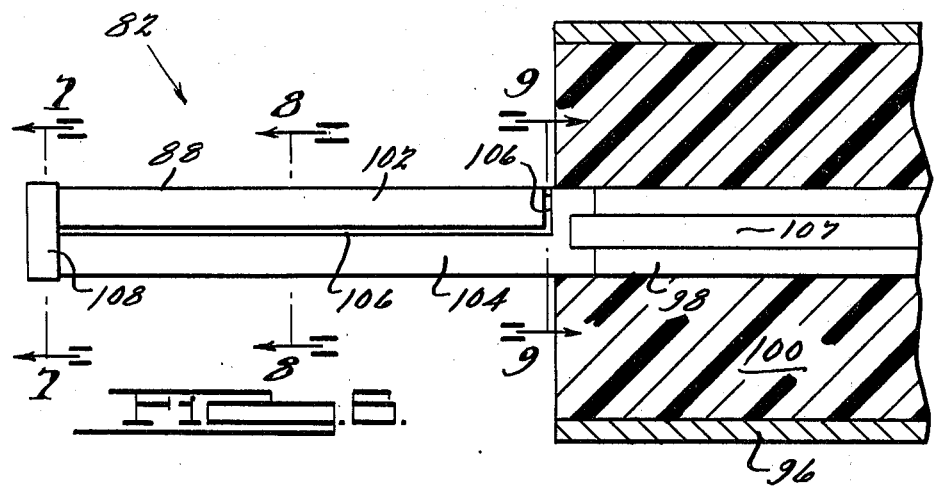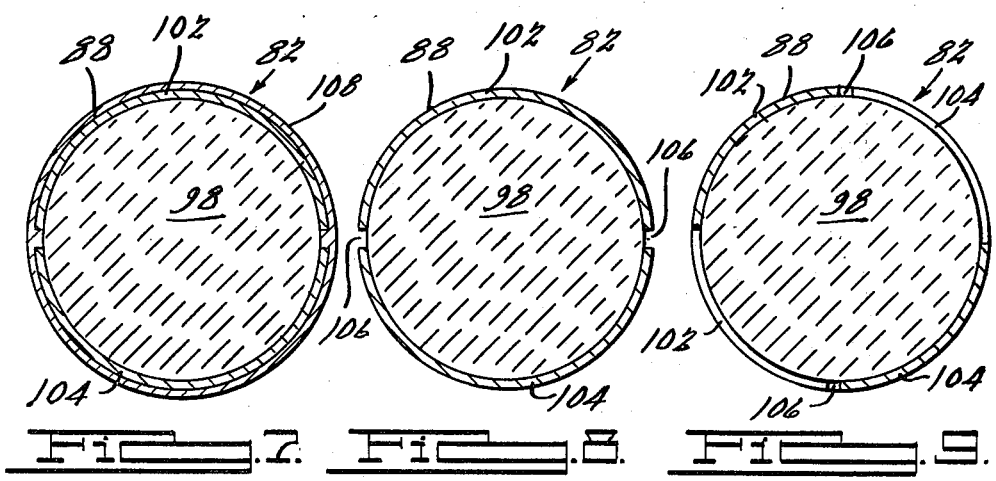

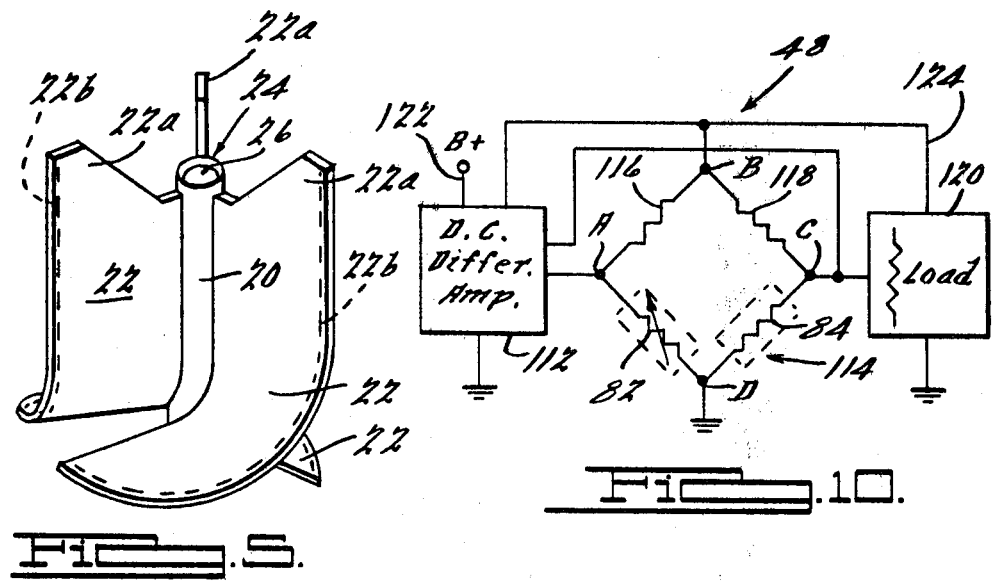
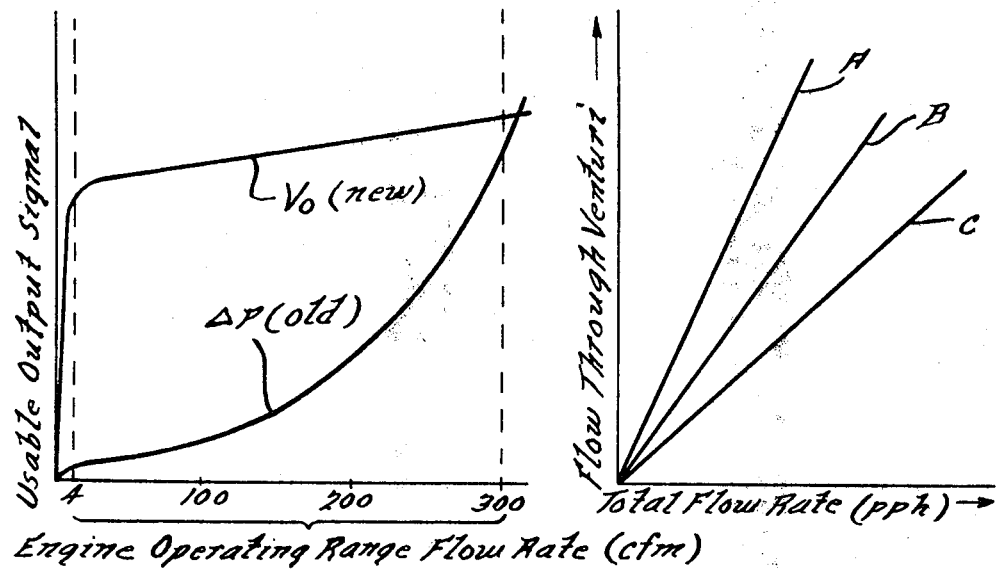

HOT FILM FLUID FLOWMETER WITH AUXILIARY FLOW SENSING

FIELD OF THE INVENTION

This invention relates to fluid flowmeters in general and particularly to such flowmeters designed specifically for use in automotive internal combustion engines.

CROSS-REFERENCE

The invention described in the present application represents an improvement of that described in U.S. Ser. No. 265,119 filed May 19, 1981 and is related to the inventions described in the U.S. Pat. Nos. 4,164,144, 4,136,565, 4,232,549 and 4,282,751 as well as U.S. Ser. No. 187,294 filed Sept. 15, 1980 and now U.S. Pat. No. 4,324,143.

BACKGROUND OF THE INVENTION

Fluid flowmeters of the pressure drop or differential pressure type are well known. Orifice plate and venturi flowmeters are probably the most common of the pressure drop type. Orifice plate flowmeters are inexpensive, but they are inherently high energy loss devices since the measured pressure drop across the orifice is non-recoverable, i.e. the drop in pressure is a drop in total pressure. Venturi flowmeters are low energy loss devices relative to orifice plate flowmeters since most of the pressure drop in the venturi throat is recoverable at the venturi outlet, i.e. the drop in pressure in the throat is due to an increase in kinetic energy of the fluid. However, when either of these flowmeters are used to measure fluid flow which varies over a wide range, such as air flow to an automotive engine, they either overly restrict total air flow at high engine speeds and loads if they are sized small enough to provide an adequate differential signal at low engine speeds and loads, or they provide an inadequate differential pressure signal at low engine speeds and loads if they are sized larger.

One prior art patent (U.S. Pat. No. 3,889,536) proposed a fluid flowmeter having a main air flow passage and a relatively small venturi in the main passage for receiving a portion of the total air flow and providing a static pressure signal for determining volumetric air flow in conjunction with a stagnation pressure signal in the main passage. This same patent also proposed placing a restriction in the main passage between the venturi inlet and outlet to increase the pressure difference across the venturi and thereby increase the pressure difference between the static and stagnation pressure. However, the restriction has the disadvantage of increasing the total pressure drop across the flowmeter, thereby increasing energy losses and decreasing the operating range of the flowmeter.

An additional shortcoming of many prior art devices resides in the fact that they are dedicated to a particular application and cannot easily be adjusted or reconfigured to accommodate differing applications or operational variations in a given application from system to system. For example, many flowmeters intended for automotive application are designed for an engine of known displacement and idealized respiration characteristics. Such flowmeters are often unsuitable for engines of slightly differing displacement or engines of the same displacement which fall in the outer fringe of design tolerances.

One prior art approach to effectively increase the operating range of a flowmeter while maintaining an acceptable pressure signal level is the bypass, which operates to shunt some of the fluid flowing through the meter around the swirl vanes, orifice, venturi or other signal generating element therein. Although such devices extend the range of operation, they have two major shortcomings. First, an inherent error factor is invited when the totality of air flow is not measured inasmuch as the ratio of measured air flow to bypassed air flow may vary. Additionally, such devices add mechanical complexity with its incumbent cost, reduced response (due to the mass of the moving parts) and shortened lifetime (due to the exposure of the interface between moving and non-moving parts to moisture and contaminants within the air flow). Finally, the use of pneumatic sensing techniques, although enjoying some commercial success, suffers from the frailties of requiring sensing ports which can become blocked by foreign matter and may have an unacceptably short useful life.

Another prior art approach which overcomes some of the shortcomings of pneumatic sensing is the use of hot wire anemometers or the like. Such devices operate by presenting a temperature dependent resistive element to the fluid flow and passing a current therethrough. The cooling effect of the fluid as it impinges upon the sensor is offset by modulation of the control voltage or current to maintain the resistor at a constant temperature. The variation of voltage or current is a measure of air flow. A substantial amount of literature has appeared recently relating to such techniques as reflected in many prior art patents.

The hot wire anemometer, however, has several shortcomings of its own. One shortcoming is lack of accuracy. Because the heated element is fixed within a fluid passageway and the velocity inlet profile of the fluid varies substantially with various operating conditions, prior art units were forced to tolerate nominal or compromise arrangements which built in error to the fluid flow measuring process. A related problem was in the fact that the temperature sensing elements were fixed within the passageway and could not be readily calibrated once the unit was fully assembled. The most serious shortcoming, however, was in the inherent fragile nature of the flow sensing elements and their tendency to collect contaminates on the surface thereof. Prior art designs, in order to improve response characteristics of the device attempted to minimize the thermal mass of the sensing element by making it extremely fine. Although successful laboratory tests were achieved, the application of such devices in a relatively hostile automotive environment where foreign particle matter pass through the meter at high velocity led to catastrophic failure of the device by breakage of the sensing element as well as reduced heat transfer (and thus inaccuracies) from contamination. The elements were also extremely sensitive to engine backfire.

BRIEF DESCRIPTION OF THE INVENTION

The present invention overcomes the above described shortcomings by providing a fluid flowmeter which employs constant temperature thermal anemometer techniques to generate a useable output signal representative of total fluid flow while maintaining an extremely durable yet simple and inexpensive design. This is accomplished by an inventive flowmeter comprising a main passage for fluid flow, a secondary passage which extends substantially parallel to the main passage including an inlet for receiving a portion of fluid flowing in the main passage, a throat and an outlet for discharging the portion back into the main passage, a tertiary passage fluidly interconnecting a point in said main passage with the throat for the aspiration of a fluid sample therethrough, and an anemometer which monitors the flow rate of fluid sample in the tertiary passage and generates an output signal representative of total flow rate through the flowmeter. This arrangement provides the advantage of a simple flow meter design which has extremely fast response, increased low-end sensitivity, permits mass flow measurement without the use of a pressure sensor, eliminates fragile construction problems typical of hot wire sensors, reduces top-end total pressure drop and reduces contamination induced calibration shift.

In the preferred embodiment of the invention, swirl vanes are provided which operate to receive the portion of the fluid which does not pass through the secondary passage and imparts motion thereto about the axis of the main passage for creating a reduced pressure area at the outlet of the secondary passage. This arrangement has the advantage of establishing forced aspiration through the secondary and tertiary passages to ensure that total flow rate is being measured.

According to another aspect of the invention, the anemometer includes an ambient temperature compensating probe which measures the ambient temperature of the fluid entering the flowmeter and recalibrates the anemometer to factor out the effects of temperature change in flow rate calculations. This arrangement has the advantage of providing a fluid flowmeter which produces a useable output signal representative of true mass flow rate over widely varying ambient temperature conditions.

According to another aspect of the invention, the ambient temperature compensating probe includes an electrically insulative substrate which is substantially covered by a resistive coating within the tertiary passage and electrical leads directing an electrical current through the coating. This arrangement has the advantage of providing a very responsive probe with extremely low thermal inertia wherein the heat generated by the resistive coating is uniformly trapped and distributed within the substrate rather than rejected independently by the substrate into the sample fluid.

According to another aspect of the invention, the tertiary passage further includes an intermediate portion which extends upstream of its inlet and outlet. This arrangement has the advantage of providing protection of the probe from impingement thereon by foreign particles passing through the flowmeter.

According to another aspect of the invention, a needle valve calibration screw is provided to selectively restrict fluid flow through the tertiary passage. This arrangement has the advantage of providing a substantially reduced sample flow rate through the tertiary passage, thereby reducing the total flow and total percentage of contaminents impinging on the resistive probe. This limits the collection of contaminants on the probe surface that would interface with heat transfer therefrom and shift the calibration point, reducing accuracy over the life time of the flowmeter.

According to still another aspect of the invention, the anemometer in general and the temperature dependent resistance element in particular is designed to sense unidirectional fluid flow. This arrangement has the advantage of sensing fluid flow only in one direction through the flowmeter such as into an internal combustion engine but not sensing reverse flow such as during backfires or the like.

These and other features and advantages of this invention will become apparent upon reading the following specification, which, along with the patent drawings, describes and discloses a preferred illustrative embodiment of the invention in detail.

The detailed description of the specific embodiment makes reference to the accompaning drawings.

BRIEF DESCRIPTION OF THE DRAWINGS

FIG. 1, is a top plan view of the preferred embodiment of the fluid flowmeter with a portion of the mesh broken away to illustrate the internal details thereof;

FIG. 2, is a cross-sectional view taken on line 2—2 of FIG. 1;

FIG. 3 is a fragmentary cross-sectional view taken on line 3—3 of FIG. 2;

FIG. 4, is a fragmentary cross-sectional view taken on line 4—4 of FIG. 2;

FIG. 5, is perspective view of the swirl vane-venturi assembly employed within the flowmeter of FIG. 1;

FIG. 6, is a fragmentary blow up of the heated probe employed within the flowmeter of FIG. 2;

FIG. 7, is a cross-sectional view taken on line 7—7 of FIG. 6 on a still enlarged scale;

FIG. 8, is a cross-sectional view taken on line 8—8 of FIG. 6 on the scale of FIG. 7;

FIG. 9, is a cross-sectional view taken on line 9—9 of FIG. 6 on the scale of FIG. 7;

FIG. 10, is a schematic diagram of the constant temperature thermal anemometer employed within the flowmeter of FIG. 1;

FIG. 11, is a differential pressure and output voltage (usable output signal) versus flow rate response graph contrasting the present invention with a typical prior art device; and FIG. 12, is a venturi flow versus total flow rate response graph taken for three various experimental configurations having different venturi area ratios.

DETAILED DESCRIPTION OF THE SPECIFIC EMBODIMENT

Referring to the drawing figures, the present invention provides a hot film/swirl mass air flowmeter 10 which is intended for automotive application to monitor mass air flow into a conventional internal combustion engine. A typical contemplated installation would entail incorporating flowmeter 10 into the air filter inlet horn present in most vehicles immediately upstream of the carburetor or injector body. Flow meter 10 would be employed to provide continuous and dynamic control of the fuel quantity delivered to the engine in response to the various speed, load, coolant temperature, and emissions control devices.

It is to be understood however that in its broadest sense, the present invention can be employed with equal succss in nonautomotive applications and in applications involving fluids other than air or air-gas mixtures. Accordingly, it is not to be construed as limiting in that context.

Referring to FIGS. 1 through 5, flowmeter 10 comprises a flowmeter section 12 and a sensor housing 14 formed on the outer surface thereof. Flowmeter section 12 is generally cylindrical and comprises an elongated tubular housing 16 which is open at both ends. It is to be noted that flowmeter section 12, with or without sensor housing 14, may be used in other environments as a mass flowmeter or a volumetric flowmeter. The air flow dynamics within flowmeter 10 are substantially as described in U.S. Pat. No. 4,164,144. The present invention represents an improvement thereof. Accordingly, the specification of U.S. Pat. No. 4,164,144 is incorporated herein by reference.

Housing 16 is open at both ends for inclusion in an air intake ducting system of an automobile internal combustion engine. As illustrated, air flowing through flowmeter 10 will pass downwardly as viewed in FIG. 2. An arrow 17 is provided to indicate direction of normal air flow through flowmeter 10. Housing 16 defines a main air flow passage 18 within which is disposed a venturi 20 and a set of 3 swirl vanes 22 which extend radially from the outer surface of venturi 20 to the downstream most inner surface of housing 16. Swirl vanes 22 are circumferentially evenly spaced about main air flow passage 18 and support venturi 20 in the position illustrated. The upstream most ends of swirl vanes 22 (uppermost as viewed in FIG. 2) are oriented to be parallel to the direction of air flow as it enters flowmeter 10 and thus constitute straightening vanes 22a which are integrally formed with the remainder of swirl vanes 22. The radially inner and outer most portions of vanes 22 are embedded in venturi 20 and housing 16, respectively. Although housings 14 and 16, venturi 20 and swirl vanes 22 are shown as an assembly of discrete components, it is contemplated that they could be integrally formed by casting or molding processes well known in the art. Only a single swirl vane 22 is illustrated in FIG. 2 which is intentionally misshapen to lie on a single plane parallel with the page to illustrate its interface with venturi 20 and housing 16. The actual shape of swirl vanes 22 and their interrelation with venturi 20 is best seen in the perspective view in FIG. 5 of a swirl vane/venturi subassembly 24. Although assembly 24 is illustrated as being composed as three individual swirl vanes 22, it is contemplated that more or fewer could be employed, depending upon the application contemplated without departing from the spirit of the present invention.

The optimum shape of swirl vanes 22 is empirically derived and depends upon the nature of the fluid being monitored as well as the range of flow rates contemplated. The arrangement found by the applicant to be particularly effective for a typical four or six cylinder engine defines a complex plane as is illustrated in perspective in FIG. 5. The radially outer most extent of vanes 22 are embedded in the inner surface of housing 16 to the extent indicated by the dotted lines 22b of vanes 22 in FIG. 5. In such an arrangement, it is contemplated that appropriate mating slots be formed in the outer surface of venturi 20 as well as the inner surface of housing 16 to receive swirl vanes 22, which can be press fitted therein, welded or otherwise suitably affixed for permanent retention.

The passageway through venturi 20 is defined as a secondary air flow passage 26 which will operate to intercept a portion of the air or fluid flowing through flowmeter 10 and reintroduce it back into the main air flow passage 18 downstream therefrom. Venturi 20 may be replaced by a straight walled tube or a substantially straight walled tube. However, the venturi tube has been found to provide a lower static pressure, particularly when the total air flow through flowmeter 10 is low, and therefore a very high fluid flow rate or velocity localized therein.

A wire mesh 28 is disposed at the upstream opening of flowmeter 10 to prevent large foreign objects from entering main air flow passage 18. Mesh 28 is retained in a circumferential groove 30 formed in the inner surface of housing 16 near the upper most extent thereof as viewed in FIG. 2 or, alternatively, is molded in place.

Referring to FIG. 2, housing 16 is constructed of a tubular inner housing portion 32 concentrically telescopingly received within a tubular outer housing portion 34. The inner surface of housing portion 34 has a step 35 formed therein which abuts the lowermost (as viewed in FIG. 2) end of housing portion 32. The inner surfaces of housing portions 32 and 34 coact to define a smooth constant diameter bore which is main air flow passage 18. The lowermost outer surface of inner housing portion 32 has an area of reduced diameter 36 which coacts with the inner surface of outer housing portion 34 adjacent step 35 to define an annular cavity 38. Cavity 38 fluidly communicates radially inwardly with main air flow passage 18 through three circumferentially spaced, radially aligned ports 40, the purpose of which will be described hereinbelow.

Venturi 20 is of conventional design and includes a generally converging inlet 42, a throat 44 and a diverging outlet 46. For the purposes of the present specification, throat 44 is defined as the point within secondary air flow passage 26 in which the fluid passing there through attains a maximum velocity.

Sensor housing 14 houses two tranducers employed in a constant temperature thermal anemometer indicated generally at 48 (FIG. 10) as will be described in detail hereinbelow. In addition, sensor housing 14 defines a tertiary or sample passage shown generally at 50 which fluidly interconnects throat 44 of venturi 20 with points upstream therefrom within main air flow passage 18. Sensor housing 14 is affixed to flowmeter section 12 by screws 52 or other suitable fastening means. The screws 52 illustrated in FIG. 3 serve a dual function by extending radially inwardly through housing portion 34 and terminating within housing portion 32 to secure portions 32 and 34 in their illustrated positions. Alternatively, it is contemplated that sensor housing 14 could be integrally formed with flowmeter section 12. Additionally, sensor housing 14 could be easily adapted to house all the constituent components of constant temperature thermal anemometer 48 (FIG. 10) as is illustrated in U.S. Ser. No. 265,119.

Annular cavity 38 communicates with tertiary passage 50 through a radially outwardly extending aperture 54 within housing portion 34. Aperture 54 communicates with a first passageway 56 which extends upstream thereof parallel to the axis of main flow pasage 18 and opens into a transverse bore 58. Bore 58 eminates from the point of interface between sensor housing 14 and flowmeter section 12 and extends radially outwardly therefrom, blindly terminating within sensor housing 14. Passageway 56 is composed of a semicircular groove formed within sensor housing 14 at its interface with flowmeter section 12. A second axially extending passageway 60 communicates with the end of bore 58 distal the entry point of passageway 56 and terminates at its downstream most end at a point radially outwardly from throat 44 of venturi 20. The downstream most end of passageway 60 intersects with a radially aligned bore 62 which passes entirely through sensor housing 14 and registers with a second bore 64 within outer housing portion 34. The portion of bore 62 radially outwardly from passageway 60 is fluidically sealed by an adjustment screw 66 threadably engaged therein. A needle valve member 68 depends radially inwardly from adjustment screw 66 and coacts with a valve seat 70 defined by an area of reduced diameter within bore 62 radially inwardly adjacent passageway 60 to define a sample fluid flow control valve.

Bore 62 is stepped to define an area of increased diameter 72 radially inward of seat 70 and extending radially inwardly to the interface with flowmeter section 12. A sample fluid sensing tube 74 is radially aligned and extends outwardly through bore 64 and into area of increased diameter 72 to communicate with the portion of bore 62 defining valve seat 70, and inwardly through a registering aperature 76 within venturi 20 to communicate with throat 44. An O-ring 78 is provided at the interface of housings 14 and 16 fluidly seal sensing tube 74 therewith. Needle valve member 68 and seat 70 coact to define preselectable restrictions or calibration means within tertiary passage 50.

Tertiary passage 50 comprises ports 40, annular cavity 38, aperture 54, passageway 56, bore 58, passageway 60, bore 62, (through valve seat 70), and the bore within sensing tube 74. Thus, for purposes of the present specification (as will be described in greater detail hereinbelow) tertiary passage 50 generally includes an inlet (ports 40) which are axially positioned upstream from swirl vanes/venturi subassembly 24, an outlet within throat 44 of venturi 20 and an intermediate point or portion indicated generally at 80 which is substantially upstream from both the inlet and outlet of tertiary passage 50.

Two components of anemometer 40 illustrated schematically in FIG. 10 which are illustrated in FIG. 2 comprise a hot film probe 82 and a temperature compensating probe 84. It is contemplated that special commercially available high-response probes can be employed with modifications as described herein which, in light of the present specification, are well within the capability of one skilled in the art. For example, the applicant has found probes manufactured by Thermo Systems, Inc. to be readily adaptable for application in the present invention, specifically hot film probe model 1269 and temperature compensated resistor probe model 1310. However, the recitation of these specific probe designs is intended to be by way of example only and not to be limiting in any sense.

Probe 82 passes radially inwardly through a bore 86 in sensor housing 14 terminating within passageway 60. A sensing element 88 depends from the radially inward most end of hot film probe 82 within passageway 60. As can best be seen in FIG. 4, probe 82 is secured in its illustrated position by a set screw 90 which is threadably received within a bore 92 within sensor housing 14 which intersects normally with bore 86. Although not illustrated, it is contemplated that sealing means such as O-rings would be provided to insure against air leakage.

Temperature compensating resistor probe 84 is threadably received within a bore 94 within sensor housing 14 and extends axially downwardly into bore 58. Both sensors 82 and 84 are thus positioned to sense a sample fluid flow passing through tertiary passage 50. Probe 84 is also provided with a sealing means such as a O-ring to insure substantially air-tight fit.

Two pairs of insulated electrical leads (not illustrated) are provided which electrically interconnect probes 82 and 84 with the remaining anemometer 48 circuitry illustrated in FIG. 10.

FIGS. 6 through 9 illustrate, on an enlarged scale, the detail of sensing element 88 of hot film probe 82. Probe 82 comprises a stainless steel outer sheath or protective tube 96 and an elongated quartz glass rod 98 coaxially disposed therein. An epoxy support insulator 100 electrically insulates rod 98 from sheath 96. A portion of glass rod 98 extends leftwardly (as viewed in FIG. 6) from sheath 96 and insulation 100, and is coated with a thin film of platinum or other suitable resistive coating. Subsequent to the coating, the platinum is bisected into two complementary resistive elements 102 and 104 by the removal of a small portion of the platinum by a precision industrial laser or the like to define an insulating space 106 therebetween. Because the process of plating and removal of the platinum is not directly relevant to the present invention and involves processes well known in the art, it will not be elaborated upon here. The net result of the plating and laser processing described herein above is the provision of the two resistive elements 102 and 104 which substantially cover the entire exposed end of the glass rod 98 comprising sensing element 88. Gold leads 107 (also plated on quartz rod 98) electrically interconnect platinum resistive elements 102 and 104 with the remainder of anemometer circuit 48 in FIG. 10. Gold leads 107 (only one illustrated) are circumferentially spaced on the outer surface of rod 98. The lefthand most terminus (as viewed in FIG. 6) of leads 107 are electrically connected to the righthand most extent of resistive elements 102 and 104 at a location encased by insulator 100. The lefthand most end of rod 98 as viewed in FIG. 6 is further plated by gold indicated at 108 which serves to electrically bridge resistive elements 102 and 104. The gold plate locally fills insulating space 106 as is best illustrated in FIG. 7. Restated, leads 107, resistive elements 102 and 104 and gold bridge 108 are series connected and provide a substantially uniformly distributed resistance over the entire surface area of sensing element 88. The collective resistive value of elements 102 and 104 varies linearly with temperature.

The structural arrangement of flowmeter 10 as a whole, and the positioning of the inlet and outlet of tertiary passage 50, particularly, cause the forced aspiration of a sample air flow stream through tertiary passage 50 which impinges upon the temperature sensing element of probe 84 as well as sensing element 88 of probe 82. The dimensioning of tertiary passage 50 as well as its restriction by calibration screw 66 ensures that a relatively small sample of total air flow will pass therethrough and that it will be free from turbulence due to its long length relative to its diameter causing the flow through passage 60 to be substantially laminar. Although small, the sample air flow is representative of total air flow. Because only a small flow is experienced in tertiary passage 50, hot film probe 82 is constructed so that sensing element 88 has an extremely small thermal mass and is thus very sensitive to change in flow rate. By having a tertiary passage 50 with a portion or point 80 which extends axially upwardly from the inlet and outlet points, virtually all foreign particles which could otherwise impinge upon sensing element 88 to damage or shorten its life, or cause a subsequent change in its initial calibration, will pass harmlessly through main air flow passage 18. It is to be understood that the only limitation on the positioning of the inlet is that forced aspiration results. Although the inlet is preferably located in main air flow passage 18 upstream of venturi throat 44, it could be located downstream thereof or even (in certain applications) externally of main air flow passage 18, as long as the sample flow is representative of total flow through flowmeter 10. The laminar flow characteristics of the fluid in the main air flow passage 18 at the inlet point of tertiary passage 50 will prohibit the foreign particles, because of their inertia, from altering their course sufficiently radially outwardly sufficient to enter ports 40 and then reverse direction to pass upwardly (as viewed in FIG. 2) in passageway 56. Even if a foreign particle did enter one of ports 40, the low sample flow velocity through tertiary passage 50 would most lightly cause the particle to remain within cavity 38 and not to pass further through tertiary passage 50.

The intermediate portion 80 of tertiary passage 50 is indicated as extending "substantially upstream" in the preferred embodiment. However it is contemplated that other equivalent structural arrangements would produce the same result of creating a localized abrupt change in flow direction, causing the inertia of most contaminants to carry them therepast and thereby separate them from the sample fluid stream. Accordingly, the upstream limitation is to be construed broadly as including functional equivalents.

Several ports 40 are provided with their circumferentially spaced relationship to provide averaging to the inlet of tertiary passage 50 to compensate for any variation in inlet velocity profile of the air passing through main air flow passage 18.

Finally, although a hot film probe has been illustrated in the preferred embodiment of the invention, it is contemplated that other techniques such as hot wire or grid sensing could be employed. Accordingly, definitionally, for the purposes of the present invention, a temperature dependant resistance element is broadly construed as any one of a number of types available.

The adjustable feature of adjustment screw 66 allows for unit to unit repeatability and the ability to compensate for mechanical or other variances in production from the design norm.

Referring to FIG. 10, a schematic diagram of anemometer 48 is illustrated. Anemometer 48 comprises an active power supply such as a D.C. differential amplifier 112 and a four element resistance bridge designated generally at 114. Bridge 114 is made up of four series connected elements, the point of interconnection between each adjacent pair of elements designated as nodes A through D. Nodes A and B, and B and C are interconnected by fixed value resistors 116 and 118, respectively. Nodes C and D are interconnected by probe 84 which, electrically, is a resistor whose value varies with ambient temperature. Finally, nodes D and A are interconnected by probe 82 which varies in resistance as a function of the velocity of the fluid impinging thereagainst. Restated, the resistance of probe 82 will vary directly as a function of its ability to transfer heat to the relatively cooler fluid impinging thereon. Because a fast response time to instantaneous changes in the fluid flow rate is desirable in such devices, the thermal mass of the sensing element 88 of probe 82 has been minimized to provide more rapid and efficient transfer of heat directly to the fluid. It is this small thermal mass which has made most prior art devices extremely prone to breakage.

D.C. differential amplifier 112, node D and a load 120 are grounded or, alternatively, commonly interconnected. Amplifier 112 has two input voltage terminals which are electrically connected to nodes A and C, an external power supply input terminal which is interconnected to a D.C. power supply through leads 122 and a bridge voltage output terminal which is electrically connected to node B and interconnected to load 120 through leads 124. An active power supply is defined as one which will continuously vary its output current, voltage, power factor or the like as a function of an input. Because the application of constant temperature thermal anemometers for measuring steady state as well as transient phenomena is fairly well known in the art, a detailed description of all aspects of operation of anemometer 48 will be deleted here for the sake of brevity.

OPERATION

The dynamics of flow passing through flow meter 10 is substantially as described in U.S. Pat. No. 4,164,144. Air enters the inlet of main passage 18 with a given axial or transport velocity. A portion of the air flows through the inlet 42 of venturi 20 and the remainder of the air flows through straightening vanes 22a to remove substantially all pre-swirl of the air due to upstream conditions. When the air leaves the straightening vanes, it has a substantially uniform and homogeneous axial flow pattern parallel to the central axis as it enters the swirl vanes 22.

The swirl vanes impart a tangential swirl velocity vector to the air. The axial and tangential velocity vector components of the swirl velocity form an air flow pattern (known as a forced-vortex flow) similar to a tornado which has a high velocity at its central axis and a diminishing velocity radially outward from the central axis. This resulting radial velocity gradient forms an associated radial pressure gradient having a low static pressure region at the central axis. Because of the relative axial positioning of swirl vanes 22 and outlet 46 of venturi 20, this low static pressure region is located directly downstream of venturi 20. This low pressure accelerates the air leaving the outlet of the venturi (forcing it to aspirate) and therefore amplifies the velocity of the air flowing through the venturi. As a result, the static pressure of the air in the venturi throat 44 is proportionally decreased. This forced aspiration will, in turn, establish a proportionally increased pressure differential between the inlet of tertiary passage 50 (ports 40) and its outlet (the opening of sensing tube 74 within the throat 44 of venturi 20), causing aspiration of the fluid sample therethrough. The total volumetric or mass air flow through the flowmeter may then be calculated in a known manner by known fluid flow principles. The air flow rate in the tertiary passage, although relatively low, is directly related to the total air flow rate through the meter as well as the air flow rate through the venturi. Hence, the disclosed flow meter does not depend upon or use localized air flow techniques to measure air flow, which localized air flow in some modes of operation may be far from representative of total air flow through the meter. Although swirl vanes are the preferred way of ensuring correlation of air flow rate in the tertiary passage with total air flow, the present invention in its broadest sense relates to any instrumentality which will achieve the same result.

By placing a hot film surface sensor such as element 88 of probe 82 in the tertiary passage 50 using the constant temperature principal by varying or modulating the current flowing therethrough to maintain a constant film temperature, the sensed flow through the tertiary passage is directly proportional to total flow. Restated, the electrical current required to keep the hot film temperature constant is directly related to mass flow. When mass flow rate is to be determined, the bridge 114 must be rebalanced as a function of ambient temperature.

The linear correlation between flow rate through the tertiary passage 50 and total flow rate has been experimentally verified by the applicant. Referring to FIG. 12, prototypes having differing venturi area ratios were tested. Each time the venturi flow to total flow relationship was linear and passed through the origin with only the (constant) slopes varying between units. Similar results can be achieved by selectively varying orifice adjustment position.

The major advantage of the present invention over pneumatic type prior art devices is reflected in the graph illustrated in FIG. 11. A gross attenuation in usable output signal was a major shortcoming in such prior art devices. As the graph suggests, the present invention provides a substantial amount of usable signal output, even at minimal flow rates, so that substantially less complex downstream electronic control is required and the flowmeter can be detuned or desensitized to afford unit to unit repeatability.

The heated sensor (resistive elements) 102 and 104 are collectively part of the bridge circuit 114 that supplies electrical current (heating) to the sensor to maintain its temperature above ambient. The rate of heat loss is a direct measure of the product of air density and velocity. The current through the sensor is so adjusted as to keep the sensor temperature, and thus resistance, constant. A feedback circuit is used to automatically maintain a desired (safe) hot film temperature for every velocity to prevent sensor burn-up. A thin layer of sputtered quartz can be supplied to protect the sensor. Additionally, teflon or other light material can be supplied as a film to prevent contamination.

The provision of flow averaging means such as swirl vanes 22 effects integration of flow through the entire cross section of main air flow passage 18. It is this feature that makes the present invention insensitive to velocity inlet profile variations and enables single point sensing of total volumetric or mass flow rates.

It is to be understood that the invention has been described with reference to a specific embodiment which provides the features and advantages previously described, and that such specific embodiment is susceptible of modification as will be apparent to those skilled in the art. For example, the dimensions, relative sizing of the main and secondary air flow passages as well as the number and shape of swirl vanes 22 themselves can be altered in numerous ways to accommodate a specific application without departing from the spirit of the present invention. Accordingly, the foregoing description is not to be construed in a limiting sense.

What is claimed:
1. A fluid flowmeter comprising:
means defining a main passage for the flow of a fluid therethrough;
means defining a secondary passage extending substantially parallel to said main passage and including an inlet for receiving a portion of the fluid flowing in said main passage, a throat and an outlet for discharging the portion back into the main passage;
means defining a tertiary passage fluidly interconnecting said throat and a point in said main passage displaced from said throat; and
a constant temperature thermal anemometer operative to monitor the rate of flow of fluid flowing in said tertiary passage and to generate a total flow rate output signal as a function thereof.

2. The fluid flowmeter of claim 1, wherein said means defining a main passage includes a central axis, said fluid flowmeter further comprising means operative to receive at least a portion of the remaining fluid in said main passage and impart motion thereto about said axis for creating a reduced pressure area at the outlet of said secondary passage.

3. The fluid flowmeter of claim 2, wherein said means operative to receive said remaining fluid comprises a set of swirl vanes radially disposed within said main passage at an angle oblique to the flow direction of said remaining fluid.

4. The fluid flowmeter of claim 1, wherein said secondary passage comprises a venturi.

5. The fluid flowmeter of claim 1, wherein said anemometer comprises ambient temperature compensation means.

6. The fluid flowmeter of claim 5, wherein said ambient temperature compensation means comprises a fluid temperature sensing probe disposed within said tertiary passage.

7. The fluid flowmeter of claim 1, further comprising means operative to selectively restrict fluid flow through said tertiary passage.

8. The fluid flowmeter of claim 7, wherein said flow restriction means comprises a needle valve.

9. The fluid flowmeter of claim 1, wherein said point in said main passage is upstream of said throat.

10. The fluid flowmeter of claim 1, wherein said anemometer comprises a hot film resistance probe disposed within said tertiary passage.

11. The fluid flowmeter of claim 10, wherein said probe comprises:
an electrically insulative substrate disposed within said tertiary passage
a resistive coating carried by and substantially covering said substrate; and
a pair of leads operatively connected to said coating to direct an electric current therethrough.

12. The fluid flowmeter of claim 11, wherein said coating is segmented and further comprises means operative to electrically bridge said segments for the flow of said current therebetween.

13. A fluid flowmeter comprising:
means defining a main passage for the flow of a fluid therethrough and including a central axis;
means defining a secondary passage extending substantially parallel to an axis defined by said main passage, said secondary passage including an inlet for receiving a portion of the fluid flowing in said main passage, a throat and an outlet for discharging the portion back into the main passage;
means defining a tertiary passage fluidly interconnecting said throat and a point axially displaced from said throat for the aspiration of a fluid sample therethrough;
a temperature dependent resistance element for sensing the rate of flow of said sample while within said tertiary passage; and
means operative to establish an electric current within said element and to modulate said current to maintain said element at a substantially constant temperature whereby the extent of said modulation is representative of total fluid flow through said main passage.

14. The fluid flowmeter of claim 13, further comprising means operative to receive at least a portion of the remaining fluid in said main passage and impart motion thereto about said axis for creating a reduced pressure area at the outlet of said secondary passage.

15. The fluid flowmeter of claim 14, wherein said means operative to receive said remaining fluid comprises a set of swirl vanes radially disposed within said main passage at an angle oblique to the flow direction of said remaining fluid.

16. The fluid flowmeter of claim 13, wherein said secondary passage comprises a venturi.

17. The fluid flowmeter of claim 13, wherein said means operative to establish an electric current further comprises ambient temperature compensation means.

18. The fluid flowmeter of claim 17, wherein said ambient temperature compensation means comprises a fluid temperature sensing probe disposed within said tertiary passage.

19. The fluid flowmeter of claim 13, further comprising means operative to selectively restrict fluid flow through said tertiary passage.

20. The fluid flowmeter of claim 19, wherein said flow restriction means comprises a needle valve.

21. The fluid flowmeter of claim 13, wherein said point in said main passage is upstream of said throat.

22. The fluid flowmeter of claim 13, wherein said temperature dependent resistance element comprises a hot film probe disposed within said tertiary passage.

23. The fluid flowmeter of claim 22, wherein said probe comprises:
an electrically insulative substrate disposed within said tertiary passage
a resistive coating carried by and substantially covering said substrate; and
a pair of leads operatively connected to said coating to direct an electric current therethrough.

24. The fluid flowmeter of claim 23, wherein said coating is segmented and further comprises means operative to electrically bridge said segments for the flow of said current therebetween.

25. A fluid flowmeter comprising:
a housing defining a main passage for the flow of a fluid therethrough and including a central axis;
a venturi disposed substantially concentrically within said main passage and comprising a converging inlet for receiving only a portion of the fluid flowing in said main passage, a throat and a diverging outlet for discharging the portion back into the main passage;
a tertiary passage disposed externally of said main passage and including an inlet in fluid communication with said main passage at a point upstream of said throat and an outlet in fluid communication with said throat;
a plurality of circumferentially spaced swirl vanes radially interconnecting said housing and venturi at an angle oblique to said axis, said swirl vanes collectively operative to receive at least a portion of the remaining fluid in said main passage and impart motion thereto about said axis for creating a reduced pressure area at the outlet of said venturi; and
a constant temperature thermal anemometer operative to monitor the rate of flow of fluid flowing in said tertiary passage and to generate a total flow rate output signal as a function thereof, said anemometer comprising;
a four element resistance bridge circuit, one of said elements comprising a temperature dependant resistor disposed within said tertiary passage for impingement of said fluid thereon, and
an active power supply operative to establish an electric current within said resistor, to modulate said current to maintain said resistor at a substantially constant temperature to offset the cooling effect of the fluid impinging thereon, and to generate said signal in proportion to the extent of said modulation.

26. The fluid flowmeter of claims 1, 13 or 25, wherein said tertiary passage further comprises an intermediate portion extending upstream of said point.

* * * * *